United States Patent [19]
Sands

[11] 3,879,520
[45] Apr. 22, 1975

[54] METHOD FOR DISSOLVING CERAMIC BERYLLIA

[75] Inventor: Arthur E. Sands, Oak Ridge, Tenn.

[73] Assignee: The United States of America as represented by the United States Atomic Energy Commission, Washington, D.C.

[22] Filed: Jan. 31, 1963

[21] Appl. No.: 255,740

[52] U.S. Cl. .................... 423/5; 423/4; 423/115; 423/131
[51] Int. Cl. ............................................. C01g 56/00
[58] Field of Search ............ 23/14.5 A, 14.5 T, 18, 23/22, 24.2, 51, 140; 423/5, 4, 115, 131

[56] References Cited
UNITED STATES PATENTS
2,063,811  12/1936  Jaeger.................................. 23/18
2,238,206  4/1941  Adamoli ............................. 23/24.2

Primary Examiner—Stephen J. Lechert, Jr.
Attorney, Agent, or Firm—John A. Horan; David S. Zachry

EXEMPLARY CLAIM

A process for dissolving a nuclear fuel composition consisting of 1. A sintered mass containing beryllia, a nuclear fuel selected from uranium and plutonium and a stabilizing agent, sintered at a temperature of at least 1500°C. to a density of about 2.7 grams/cc which comprises contacting said sintered mass with a stoichiometric excess of lithium oxide dissolved or dispersed in a carrier selected from lithium hydroxide, sodium hydroxide or sodium nitrate at a temperature in the range 750°C–850°C. to convert the berryllia to lithium beryllate and thereafter recovering the nuclear fuel content of said mass.

4 Claims, No Drawings

METHOD FOR DISSOLVING CERAMIC BERYLLIA

The present invention relates to a method for dissolving ceramic beryllia. More particularly, it relates to a method for dissolving nuclear fuel elements containing ceramic beryllia and uranium or plutonium in such a manner as to permit recovery of the uranium or plutonium as an aqueous solution thereof.

The refractory oxide, beryllia, is used as a matrix material or as a cladding in the fabrication of nuclear fuel elements designed to function at temperatures in excess of 700°C. Nuclear fuels are dispersed in a matrix to increase thermal conductivity of the element, to dilute enriched fuel, to strengthen the element mechanically and to impart an increased measure of corrosion resistance to the elements. The function of the cladding is to prevent fuel and fission product diffusion, and to protect the fuel from corrosive atmospheres. Beryllia is an excellent high temperature fuel element material for use in thermal reactors because of its low absorption cross-section, high thermal conductivity, mechanical strength, chemical inertness, resistance to radiation and relative ease of fabrication.

While the physical and chemical characteristics of beryllia-containing fuels are largely determined by the constituents of the finally formed element, the fabrication of such fuels also has a direct effect on the strength and corrosion resistance of the finally formed element. Thus, in the preparation of nuclear fuel elements to which the process of this invention is directed, a powdered mixture of beryllia and a refractory uranium compound such as $UO_2$, $UC$, $UC_2$, a uranium silicide or nitride, together with a stabilizing agent and an organic binder are blended in paste form, dried, and sintered at a temperature in excess of 1,500°C. to a density of at least 2.7 grams/cc. The stabilizing agent is added to decrease the sensitivity of beryllia to water vapor at elevated temperatures and to impart an increased measure of mechanical strength to the formed element. Stabilizing agents which perform these functions may be selected from the rare earth oxides such as yttria or a refractory oxide of niobium, zirconium, and aluminum.

It has been found that the combined effect of the stabilizing agent and the high sintering temperature converts the finally formed beryllia-containing element into an extremely unreactive corrosion-resistant form — so much that it is not readily dissolved by chemical reagents which are known as effective dissolvents for beryllia. Thus, for example, boiling concentrated aqueous solutions of mineral acids such as sulfuric, hydrofluoric, nitric and aqua regia, fused salts and steam, all of which are known to dissolve beryllia in a relatively short time, are virtually unreactive with respect to ceramic beryllia-containing fuel elements fabricated at a sintering temperature in excess of about 1,500°C. to a density of at least 2.7 grams/cc and containing a stabilizing element of the character described. While the extremely unreactive character of such elements is desirable in a nuclear fuel, it introduces a severe problem in recovering uranium and/or plutonium from the irradiated spent fuel and unirradiated scrap resulting from the fabrication of such elements. The scrap resulting from the fabrication of beryllia-containing fuel elements and the spent irradiated fuel charges contain sufficient amounts of uranium to warrant its recovery if an economical and practical recovery process were available. It is, therefore, an object of the present invention to provide a practical and economical process for recovering uranium or plutonium from beryllia-containing fuel elements of the character described.

The most practical way to recover the uranium or plutonium from such elements is to dissolve at least a portion of the beryllia and thus render the uranium or plutonium leachable by a mineral acid, preferably nitric acid. Once a solution of uranyl or plutonyl nitrate solution is formed, it becomes a matter of standard operational technique to recover the uranium or plutonium in a highly purified form by either a selective precipitation process or by selective solvent extraction, or by a combination of both.

In a practical dissolution process used as the first step in the economical recovery of a purified uranium or plutonium product, the fuel element to be treated must be dissolved in a minimum amount of time, at a rapid but controllable rate to produce a minimal liquid volume, and under such conditions as to enable the dissolution to take place in an available material of construction to contain the reaction. The requirement for a minimal dissolution time is important because of its direct effect on the economics of the dissolution process in terms of labor and equipment size. For example, a reaction requiring several days for completion is clearly impractical. This difficulty may sometimes be obviated by scaling up the size of equipment and amount of material treated, but for nuclear safety and economic reasons this avenue is not available in dealing with nuclear fuel recovery processes. It is, therefore, another object of this invention to provide a practical process for dissolving nuclear fuels of the character described in a rapid and controllable manner to permit quantitative recovery of the uranium and/or plutonium content of said fuel as an aqueous solution thereof. A further object of this invention is to provide a universal dissolvent for high-fired densified beryllia compositions as herein described. Still another object is to provide a method for recovering beryllium from ceramic beryllia.

According to this invention a nuclear fuel composition, containing beryllia, a selected nuclear fuel and a stabilizing agent, fabricated to a sintered density of at least 2.7 grams/cc at a sintering temperature in excess of 1,500°C. can be effectively dissolved by reacting said composition with lithium oxide ($Li_2O$) dissolved or dispersed in a liquid carrier selected from lithium hydroxide, sodium hydroxide and sodium nitrate at a temperature in the range 750°C.–850°C., and preferably at a temperature of about 800°C., to convert the beryllia to lithium beryllate. Once the beryllia has been converted to the beryllate, any uranium or plutonium in the original element can be selectively separated and decontaminated to form a purified product reusable as a nuclear fuel or for other purposes. Upon contacting the beryllate with an aqueous solution of nitric acid, it will be converted to beryllium nitrate and the uranium to uranyl nitrate. The uranyl nitrate-beryllium nitrate solution may be treated by standard selective solvent extraction techniques to isolate purified uranyl nitrate. For example, it has been found that a uranyl nitrate-beryllium nitrate solution containing a suitable salting-out agent, such as magnesium nitrate, will be quantitatively stripped of its uranium nitrate content by countercurrent contact with dibutyl carbitol. A beryllium distribution coefficient (organic/aqueous) of the order of 0.009 and a uranium separation factor of the order of 200,000 can be achieved under these conditions.

The purified uranyl nitrate solution can be concentrated by evaporation, followed by conversion to uranium oxide by heating in a denitrator or drum dryer.

If ultra-purification is desired, the uranyl nitrate separated by extraction from most of the grass contaminants (such as beryllium nitrate, for example) can be treated to precipitate uranium peroxide from an acidic solution. Most impurities, including any remaining traces of beryllium will not precipitate from such acidic solution.

To carry out the uranium peroxide precipitation 30 percent hydrogen peroxide is slowly added to the uranyl nitrate solution with the hydrogen ion concentration maintained at pH $2.0 \pm 0.2$ by the simultaneous addition of ammonium hydroxide. The precipitation is terminated when additional increments of hydrogen peroxide do not lower the pH.

The active reagent deemed responsible for the dissolution of beryllia is lithium monoxide, $Li_2O$, and the controlling reactions are believed to be exemplified by the following equations:

$$2 LiOH \rightleftharpoons Li_2O + H_2O \quad (1)$$

$$Li_2O + BeO \rightleftharpoons Li_2BeO_2 \quad (2)$$

It will be seen that the lithium hydroxide actually serves a two-fold purpose in that it is, of itself, a source of the active reagent and since the active lithium monoxide reagent is soluble in fused lithium hydroxide, the lithium hydroxide serves as a convenient liquid carrier. From equation 2 it appears that the stoichiometry requires 1 mole of lithium oxide to dissolve 1 mole of beryllia. However, in actual practice employing batch methods, little, if any, effective beryllia dissolution will take place until at least about a three-fold stoichiometric molar excess of $Li_2O$ is used at a temperature of at least 750°C.

The reaction indicated by the second equation to form lithium beryllate may be carried out in a batch-wise or continuous manner. In a batch-type process, a charge of ceramic beryllia, of the character described, is placed in a suitable corrosion resistant vessel, mixed with a stoichiometric excess of lithium oxide and heated to a temperature in the range 750°C.-850°C., preferably in an inert atmosphere. The use of an inert atmosphere is desirable primarily to reduce corrosion at the air-melt interface. Water vapor formed by the reaction (2) should be continuously removed, and if a sweep of dry inert gas is employed, this will reduce corrosion of the melt-containing vessel at the air-melt interface. A higher dissolution temperature introduces severe corrosion to the container material and should thus be avoided. A suitable material of construction for the reaction vessel may be, in the order of preference, Inconel, Monel or stainless steel 304-L. The time necessary to effect dissolution of at least 90 percent of the ceramic beryllia elements will usually require from 3 to 8 hours' heating at temperatures depending upon the composition of the elements. At the end of the heating period, the reaction vessel and its contents are cooled to a temperature below about 100°C. and then rinsed with a dilute solution of nitric acid to solubilize the nitric acid-soluble constituents. Alternatively, the fused mass is cautiously permitted to flow slowly into water, forming a slurry. Addition of 60% nitric acid to the slurry will effect complete solution. The resultant uranyl nitrate-beryllium nitrate solution may then be treated by the aforementioned selective precipitation process if further purification is required.

The method of this invention may also be carried out on a continuous basis by stacking a bed of the ceramic fuel elements in a columnar vessel and flowing a liquid composition consisting of lithium oxide dissolved or dispersed in a molten liquid carrier such as sodium hydroxide or sodium nitrate through the said packed columnar vessel at a temperature of about 800°C. In such a process, the lithium hydroxide, together with the required proportion of sodium hydroxide or sodium nitrate may be melted and dehydrated in a separate melting pot and the molten mixture then introduced into the before-mentioned columnar vessel at a controlled rate through a high temperature valve. The molten mixture then flows upward through the packed ceramic elements and out of the columnar vessel through an overflow connection near the top. Addition of a small flow of inert gas at the bottom of the column is desirable. The resulting melt of lithium beryllate and sodium hydroxide is discharged into a vessel in which water is rapidly recirculating resulting in the formation of an aqueous slurry of lithium beryllate. A continuous stream of the slurry flows next into a vessel wherein 60 percent nitric acid is added, with heat supplied, thus dissolving the lithium beryllate to form lithium nitrate.

In order to delineate the parameters involved in effecting dissolution of ceramic beryllia elements, a summary of dissolution data is provided in the following table in which separate charges of a highly densified ceramic beryllia-uranium dioxide sintered fuel element rods and tubes were dissolved in a batch-wise manner in accordance with the above-described procedure. The elements consisted of a dispersion of uranium dioxide in a matrix of beryllia and including yttria as a stabilizing agent. The elements were fabricated by mixing from 70-90 percent (by weight) powdered beryllia with from 5-15 percent uranium dioxide, a stabilizing agent and a binder to form a paste. The paste was then extruded into rods and tubes of varying lengths, after which said rods and tubes were sintered at temperatures in the range 1,500°C. to about 2,300°C.

To demonstrate the extreme corrosion resistance of these elements, attempts were made to dissolve them in concentrated solutions of nitric acid; sulfuric acid; hydrofluoric acid; aqua regia mixtures of nitric acid and hydrochloric acid, and hydrofluoric acid mixed with ammonium fluoride at temperatures up to the refluxing temperatures of these respective solutions. In all cases it was found that, even after extended residence times in such solutions up to over 24 hours, the elements had not dissolved to any appreciable extent. Moreover, in cases where residence times were prolonged for several days to determine the extent of dissolution, it was found that complete beryllia or uranium dissolution could not be obtained. Attempts, as taught by the literature, to convert the beryllia to the water soluble beryllium fluoride by treating the elements with anhydrous hydrogen fluoride at temperatures of 280°, 600°, 700°, and 750°C. were completely unsuccessful.

TABLE

| Run No. | Weight of Charge (grams) | Reagent Type[2] | Reagent Weight (grams) | Mole Ratio | Temperature (°C) | Time (hrs) | Dissolution[1] (%) |
|---|---|---|---|---|---|---|---|
| 1 | 25 | NaOH | 232 | 5.8:1 | 650 | 3 | 8 |
| 2 | 150 | NaOH | 480 | 2:1 | 800 | 9 | 18 |
| 3 | 25 | NaOH | 80 | 2:1 | 800 | 3 | 4 |
|   |   | NaNO$_3$ | 170 | 2:1 |   |   |   |
| 4 | 25 | LiOH | 245 | 5.8:1 | 650 | 3 | 12 |
| 5 | 50 | LiOH | 500 | 6:1 | 650 | 6 | 15 |
| 6 | 50 | LiOH | 254 | 3:1 | 800 | 6 | 86 |
| 7 | 50 | LiOH | 340 | 4:1 | 800 | 6 | 100 |
| 8 | 25 | LiOH | 250 | 6:1 | 800 | 3 | 92 |
| 9 | 25 | LiOH | 250 | 6:1 | 800 | 6 | 100 |
| 10 | 25 | LiOH | 250 | 6:1 | 800 | 6 | 97 |
| 11 | 50 | LiOH | 500 | 6:1 | 800 | 6 | 100 |
| 12 | 150 | LiOH | 252 | 1:1 | 700 | 8 | 3.3 |
|   |   | NaOH | 120 | 0.5:1 |   |   |   |
| 13 | 25 | LiOH | 420 | 10:1 | 800 | 12 | 98 |
|   |   | NaOH | 200 | 5:1 |   |   |   |
| 14 | 50 | LiOH | 336 | 4:1 | 800 | 5 | 88 |
| 15 | 25 | LiOH | 168 | 4:1 | 800 | 6 | 80 |
|   |   | NaOH | 40 | 1:1 |   |   |   |
| 16 | 25 | LiOH | 168 | 4:1 | 800 | 6 | 74 |
|   |   | NaOH | 40 | 1.5:1 |   |   |   |
| 17 | 25 | LiOH | 168 | 4:1 | 800 | 6 | 70 |
|   |   | NaOH | 80 | 2:1 |   |   |   |
| 18 | 150 | LiOH | 252 | 1:1 | 800 | 12 | 52.7 |
|   |   | NaOH | 160 | 0.67:1 |   |   |   |

[1] % dissolution = $\frac{\text{weight of original sample} - \text{weight of undissolved sample}}{\text{weight of original sample}} \times 100$

[2] Although the active reactant is Li$_2$O, reagent weights and ratios given in this table are based on the starting material, LiOH.

The tabulated data clearly show that complete dissolution of the ceramic beryllia-containing fuel charge can be effected with the active reactant lithium oxide at a temperature of 800°C. using, in batch processing, three times the stoichiometric requirement of the active reagent within a 6 hour reaction time. By keeping other parameters constant, time may be reduced and still achieve approximately 90 percent dissolution. Also, by keeping other parameters constant, the ratio of reactant may be reduced and still achieve 90 percent dissolution. In batch processing, a residue amounting to only 10 percent may be economically recylced to the next starting charge of material. Also, when 90 percent dissolution is achieved, somewhat more than 90 percent recovery of the original uranium content may result after acid leaching of the residue.

The tabulated data also shown (Run No. 18) that when the active reactant (mixed with a carrier agent such as sodium hydroxide) is present to the extent of only 50 percent of the stoichiometrical requirement, complete reaction of the active reactant is achieved. This is the condition that is experienced in the continuous flow alternative of the process where the molten reagent is passed up through a column packed with ceramic elements at a temperature of 800°C.

In such a continuous process only theoretical consumption of lithium oxide is required thus reducing the reagent cost normally associated with the excess requirements for a batch process. Acid required for reaction with the slurry is also less because of the lower requirement for acidification and the density of the final solution will be higher for the same reason — a condition more favorable for subsequent processing.

It should be pointed out that while the process of this invention has been shown to have particular utility in effecting dissolution of an extremely corrosion resistant beryllia-containing composition of the character described, it is by no means limited to such use. As previously pointed out, the corrosion resistance of a beryllia-containing composition depends upon the constituents of said composition and its prior fabrication history. It should be understood that many beryllia compositions are readily dissolved by the mineral acid and other dissolving reagents previously referred to. The unique advantage of using lithium monoxide is that it is a universal dissolvent for all ceramic beryllia-containing compositions regardless of composition or prior fabrication history. In all cases, substantially complete dissolution of the beryllia and conversion to lithium beryllate will be effected in batch processing, with at least a threefold stoichiometric excess of the active reagent at a temperature of at least 750°C. to convert the beryllia to the acid-soluble lithium beryllate while simultaneously rendering the uranium available for leaching to form a uranyl nitrate solution. A still further advantage of lithium oxide is that it can effect complete dissolution of beryllia and leave no insoluble residues as is the case with many of the known mineral acid dissolvents for beryllia. It has been the experience of of prior workers in this field that while mineral acid or mineral acid combinations will readily dissolve beryllia-containing compositions, complete dissolution may not be effected. Small but significant uranium-containing acid insoluble residues remain even after extended leaching at reflux temperatures. This is not the case with lithium oxide. Furthermore, in a continuous process, the same results can be achieved with the use of only the stoichiometrical requirements of the active reactant, lithium oxide, when mixed with a carrier agent such as sodium hydroxide. In addition to the dissolution process being of value in the recovery of uranium or plutonium, the beryllium matrix of the elements can be recovered from the nitric acid solution (raffinate) following uranium or plutonium extraction. This can be done by precipitation of the beryllium as hydroxide by the addition of an alkali, such as sodium hydroxide, with further purification in accordance with the known art. Beryllium hydroxide can be converted to beryllium oxide (beryllia) by heating to 500°C.

It should also be understood that while the dissolution process was illustrated with uranium-containing samples, it is equally effective for use in dissolving plutonium from beryllia-containing compositions of the character described.

Having thus described my invention, I claim:

1. A process for dissolving a nuclear fuel composition consisting of a sintered mass containing beryllia, a nuclear fuel selected from uranium and plutonium and a stabilizing agent, sintered at a temperature of at least 1500°C. to a density of about 2.7 grams/cc which comprises contacting said sintered mass with a stoichiometric excess of lithium oxide dissolved or dispersed in a carrier selected from lithium hydroxide, sodium hydroxide or sodium nitrate at a temperature in the range 750°C–850°C. to convert the beryllia to lithium beryllate and thereafter recovering the nuclear fuel content of said mass.

2. The process according to claim 1 wherein the stabilizing agent is selected from a rare earth oxide, zirconia, niobia, and aluminia.

3. The process according to claim 1 wherein the $Li_2O/BeO$ molar ratio is maintained at a value of at least about 3.

4. A process for dissolving beryllium values from a sintered beryllia composition which comprises contacting said composition with at least a three-fold stoichiometric excess of lithium oxide dissolved or dispersed in a carrier selected from LiOH, NaOH and $NaNO_3$ at a temperature of at least 750°C.

* * * * *